Feb. 11, 1958 — P. S. SMITH — 2,822,965
POURING SPOUTS FOR LIQUIDS
Filed June 23, 1954 — 4 Sheets-Sheet 1

INVENTOR.
Parker S. Smith
BY Owen + Owen
ATTORNEYS

Feb. 11, 1958 P. S. SMITH 2,822,965
POURING SPOUTS FOR LIQUIDS
Filed June 23, 1954 4 Sheets-Sheet 2
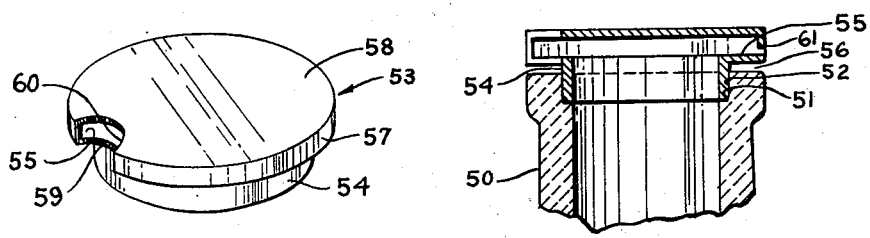
FIG. 8. FIG. 9.
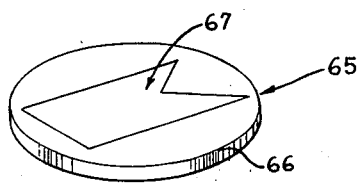 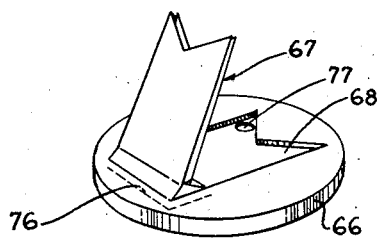
FIG. 10.

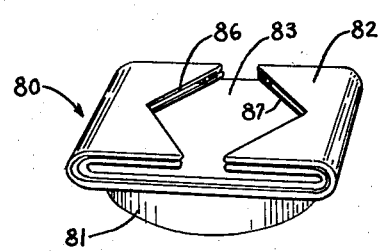
FIG. 12. FIG. 13.
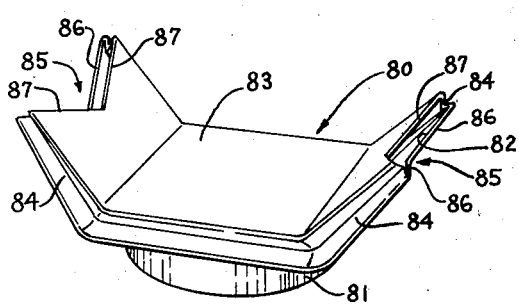
FIG. 14.
INVENTOR.
Parker S. Smith
BY Owen + Owen
ATTORNEYS Feb. 11, 1958  P. S. SMITH  2,822,965
POURING SPOUTS FOR LIQUIDS
Filed June 23, 1954  4 Sheets-Sheet 3

INVENTOR.
Parker S. Smith
BY Owen+Owen
ATTORNEYS

Feb. 11, 1958         P. S. SMITH         2,822,965
POURING SPOUTS FOR LIQUIDS
Filed June 23, 1954                         4 Sheets-Sheet 4
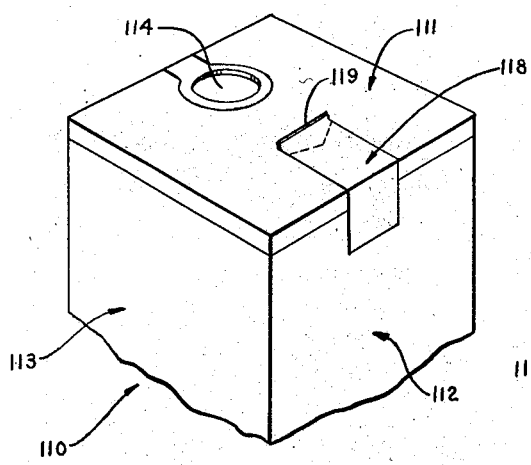
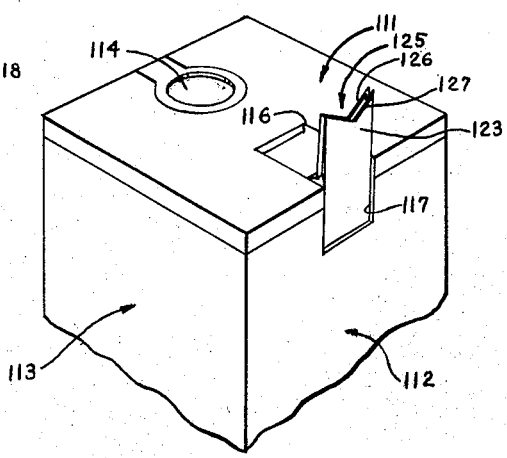
FIG. 21.         FIG. 22.
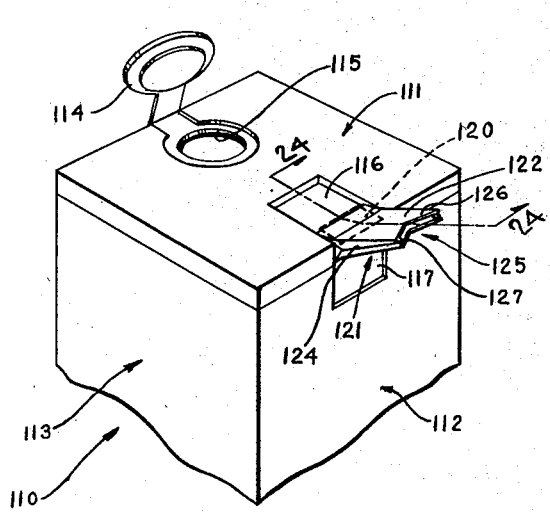
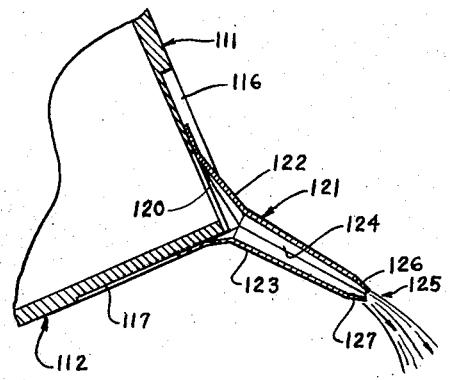
FIG. 23.         FIG. 24.
INVENTOR.
Parker S. Smith
BY Owen + Owen
ATTORNEYS United States Patent Office 2,822,965
Patented Feb. 11, 1958

2,822,965
POURING SPOUTS FOR LIQUIDS
Parker S. Smith, Metamora, Ohio
Application June 23, 1954, Serial No. 438,648
5 Claims. (Cl. 222—571)

This invention relates to pouring spouts for liquids which are embodiments of a concept whereby the dripping of the liquid being poured down the exterior of the spout is eliminated.

Many pouring spouts for different kinds of liquids have been designed in attempts to prevent the liquid being poured from clinging to, adhering to or wetting the edges of the pouring spouts and running off the edges of the pouring spouts and down the vessels on which the spouts are located when the pouring is terminated. This undesirable result particularly occurs when the liquid being poured is relatively viscous and has a high adhesion with the surface of the vessel adjacent the spout or with the edges of the spout itself. The problem of preventing the dripping of a thick liquid such as molasses or syrup, is well known. Similar problems occur, however, with thinner liquids such as alcoholic beverages, food sauces, juices and milk. It is a common occurrence when pouring milk from a bottle or from one of the newer wax paper containers, to have several drops of milk run down the exterior of the container. The reasons why such dripping is undesirable are well known and include cleanliness, odor free storage, the elimination of dripping onto other objects, for example located on lower shelves of a refrigerator, etc.

It is the principal object of this invention to provide a pouring spout capable of embodiment in numerous modifications which effectively handles the liquid being poured at the time of cessation of pouring to cleanly divide the liquid already poured from the liquid not to be poured out of the spout.

It is a still further object of this invention to provide a simple pouring spout having no working parts and no accessory devices or attachments which will cleanly separate liquid not to be poured from liquid already poured and will prevent the liquid not to be poured from adhering or running down the exterior of the container on which the spout is located.

These objects and others of more specific nature will be better understood from the specification which follows and from the drawings, in which:

Fig. 8 is a view in perspective of a cap embodying the invention and designed for insertion in the neck of a conventional milk bottle.

Fig. 9 is a fragmentary vertical sectional view of an upper portion of a milk bottle with a cap of Fig. 8 therein.

Fig. 10 is a view in perspective of a third embodiment of the invention in its closed position and as designed for insertion in the neck of a conventional milk bottle.

Fig. 12 is a view in perspective similar to Fig. 11 but showing the cap with its pouring spout in fully open position.

Fig. 13 is a view in perspective of a double spout cap embodying the invention and shown with the spouts in closed position.

Fig. 14 is a view in perspective of the cap shown in Fig. 13 but with the pouring spouts swung to their open positions.

Fig. 21 is a fragmentary view in front quarter perspective of a different type of waxed paper milk container equipped with a pouring spout embodying a modification of the invention.

Fig. 22 is a view similar to Fig. 21 but illustrating the container of Fig. 21 with a pouring spout embodying the invention shown in partially open position.

Fig. 23 is a view similar to Figs. 21 and 22 but showing a pouring spout embodying the invention in its fully open position.

Fig. 24 is a fragmentary, greatly enlarged, sectional view taken substantially along the line 24—24 of Fig. 23.

Figure 1:
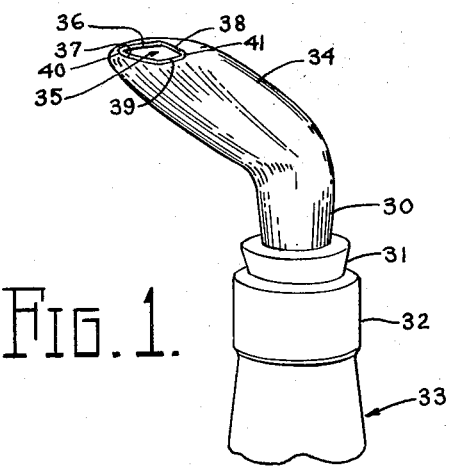
Fig. 1 is a view in perspective of a spout attachment embodying the invention as designed for the removable insertion in the neck of conventional bottles such as those in which alcoholic beverages or various liquid food ingredients or condiments are sold.
Figure 2:
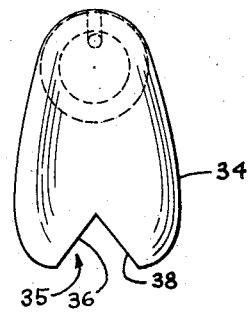
Fig. 2 is a plan view of the pouring spout shown in Fig. 1.
Figure 3:
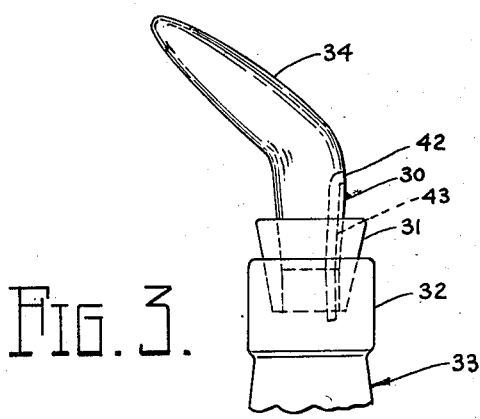
Fig. 3 is a side elevational view of the pouring spout shown in Fig. 1.

In a pouring spout embodying the invention as illustrated in Fig. 1 the entire spout is shown as being molded, for example from a synthetic resinous mateerial, possibly in two half sections and joined to each other along a generally median plane. The pouring spout in Figs. 1–4, inclusive, has a slightly tapered tubular section 30 which protrudes through the center of a hollow cork or stopper 31 that is frusto-conical in shape and of a size that is adapted to be inserted in a neck 32 of a bottle, fragmentarily indicated at 33. The neck portion 30 blends into a flared spout portion 34 which, like the neck 30, is hollow and which terminates at its forward end in a thin spout opening, generally indicated at 35.

The spout 35 in the embodiment of Figs. 1–4 is bounded by upper and lower, right and left hand lips; 36 and 37 for the left side and 38 and 39 for the right side. The upper lips 36 and 38 respectively, meet at a relatively sharp angle forming a V-slot recess in the upper surface of the spout portion 34. The lower lips 37 and 39 similarly meet at a sharp angle forming a similar V-slot recess in the lower surface of the portion 34. At their outer ends the lips 36 and 37 are joined with a small radius portion generally indicated at 40 (Figs. 1 and 4) and the two lips 38 and 39 similarly are joined by a small radius portion generally indicated at 41.

The neck 30 may be provided with a vent opening 42 and a vent tube 43 illustrated in Figs. 1–4 as a more or less conventional structure.

The apexes of the two upper lips 36 and 38 and the two lower lips 37 and 39 are shown in vertical alignment with each other in Figs. 1–4 (see Fig. 2 particularly) and it is to be observed that the mouth of the spout 35 is slightly wider at the central portion in line with the apexes of the lips 36—38 and 37—39 than it is at the edges where the radii 40—41 join the lips 36—37 and 38—39 respectively. The particular detailed shape of the pouring spout 35 defined by the four lips 36—39 and the radii 40—41 is not highly critical. The only requirements for a spout embodying the invention are that the vertical spacing between the upper lips 36—38 and the lower lips 37—39 shall be relatively small, that the lips shall remain spaced apart substantially across their entire length and thus the length of the spout 35 and that the central portion of the spout 35 shall be recessive (as at the apexes of the lips already alluded to) with respect to the outer edges of the lips 36—39 and to the direction of flow of the liquid being poured.

Figure 4:
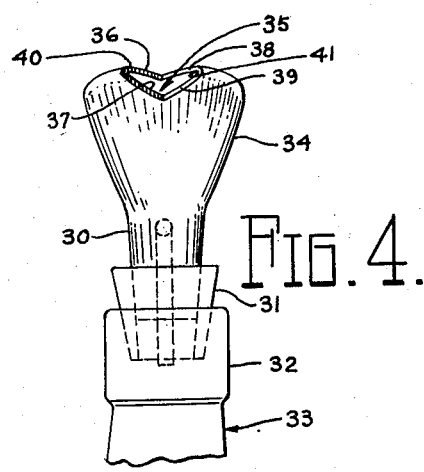
Fig. 4 is a front view in elevation of the pouring spout shown in Fig. 1.
Figures 5, 6, 7:
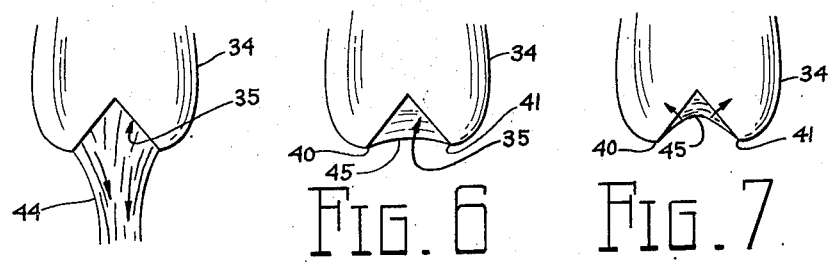
Figs. 5, 6 and 7 are diagrammatic, fragmentary views of a pouring spout embodying the invention in three positions, viz., when the liquid is being poured, immediately upon the cessation of the pouring of the liquid and immediately after the cessation of pouring of the liquid.

Figs. 5, 6 and 7 illustrate the reaction of the liquid being poured brought about by the spout shape described above upon the termination of pouring through the spout 35. In Fig. 5 a stream of liquid, generally indicated at 44, is shown as flowing freely through the spout 35. Of course, in order to achieve this free flow the entire pouring spout embodying the invention must be tilted so that it is lower than the liquid contained in the bottle 33. For example, if the pouring spout and bottle 33 of Fig. 4 were tipped forwardly from the plane of that figure until it reached the position illustrated more or less in Fig. 2, the flow of liquid 44 from the spout 35 would appear as in Fig. 5. When a desired quantity of liquid has been poured out of the spout 35, the bottle 33 is tilted backwardly to cut off the flow of liquid. As soon as the bottle is tilted to a degree such that there is insufficient liquid pressure back of the liquid in the spout 35 to cause it to flow out of the spout 35, the situation illustrated in Fig. 6 prevails. It will be observed that the surface tension of the liquid at this point of cessation of pouring, causes the liquid to withdraw slightly, forming a meniscus-like curve, generally indicated at 45, which extends across the pouring spout 35 between the radii 40 and 41 at the outer extremes of the spout 35.

It is at this point that the critical control over the liquid being poured must be exercised. If liquid at this point is being poured from an ordinary bottle or pouring spout the amount of liquid located between the lips 36—39 probably would wet over the edges of the lips 36—39, collapse and flow down the outside of the portion 34.

However, according to the invention, the design of the recessive pouring spout 35 causes the liquid which remains within the spout portion 34 to act through its surface tension with the liquid located between the lips 36—39 of the spout 35, to retract the latter liquid as is indicated by the arrows in Fig. 7. It will be observed that this retraction constitutes in a sense the splitting of the film of liquid extending between the lips 36—39 along the line generally bisecting the angle between the upper lips 36—38 and the lower lips 37—39. It may be that the surface tension of the liquid itself and the action of its molecules one for the other is sufficient to separate this film along the center line described and cause it to withdraw between the respective pairs of the lips 36—39. The shape of the lips, inducing as it does the forming of the meniscus-like curve 45, and its sharp increase from the position shown in Fig. 6 to that shown in Fig. 7, in any event, splits the film of liquid, causing a sharp and clean retraction into the spout 35 and the prevention of any dripping or running down of the exterior of the lips 36—39 or the spout portion 34.

The modification of the invention illustrated in Figs. 8 and 9 is intended for use in a conventional open neck milk bottle fragmentarily indicated at 50 in Fig. 9. A conventional milk bottle has an annular recess 51 intended for the reception of a flat disk-like cap usually fabricated from waxed paper or cardboard and held in place in the annular recess 51 by friction of the disk and a vertical wall 52 above the annular recess 51. In the embodiment of the invention illustrated in Figs. 8 and 9 a cap 53 incorporating a pouring spout according to the invention, has a generally tubular neck 54 of outer diameter appropriate to be frictionally engaged with the wall 51 and held therein quite tightly. The neck 54 has a generally horizontal upper rim 55 which overlies a rim 56 on the bottle neck 50 and is spaced thereabove a short distance because of the vertical length of the neck 54. An annular vertical wall 57 is joined to the perimeter of the rim 55 and at its upper side is joined again to a disk-like top 58 on the cap 53. The top 58 and rim 55 are parallel to each other and spaced vertically by the wall 57.

At one side of the cap 53 the rim 55 and top 58 are each cut away to form recesses bounded by a lip 59 on the rim 55 and a similar lip 60 on the top 58.

It will be observed in Figs. 8 and 9 that the lips 59 and 60 in this instance are crescent-shaped or arcuate. This shape, like the V-shape of the embodiment of the invention illustrated in Figs. 1–4, functions to cause the separation of the liquid located between the lips 59 and 60 at the time of the cessation of pouring (as illustrated in Fig. 6) and the retraction thereof with a splitting of the film on opposite sides as indicated in Fig. 7.

In Fig. 9 the cap 53 embodying the invention also is shown as having a vent opening 61 located at the side of the cap 53 opposite the lips 59 and 60.

A cap 53 as shown in Figs. 8 and 9 is an embodiment of the invention designed to be inserted in the neck of a milk bottle by the user after the conventional disk and hood caps have been removed.

Figure 11:
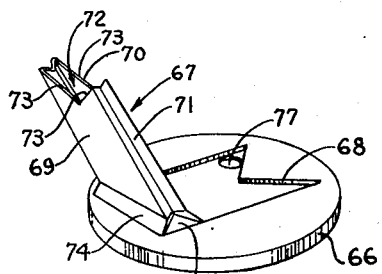
Fig. 11 is a view in perspective of the cap shown in Fig. 10, in partially open position.

Figs. 10, 11 and 12 illustrate a pouring spout embodying the invention which is intended to be inserted into the annular recess at the mouth of a milk bottle in place of the conventional flat disk-like cap presently employed in the art. In this embodiment of the invention a cap generally indicated at 65 has a disk-like body 66 of a thickness only slightly greater than that of a conventional disk cap. In Fig. 10 a spout 67 is shown as folded downwardly in closed position in a complementarily shaped recess 68 in the body 66. The spout 67 consists of a bottom 69 and top 70 connected along their lateral edges by accordion folds 71 and terminating in an inverted V-shaped recessive spout opening 72 defined by lips 73 on the spout 67. At their lower edges the bottom and top 69 and 70 are attached with folded sections 74 and 75 to the body 66 around the edges of a generally rectangular opening through the body 66 and shown in broken lines at 76 in Fig. 11. A vent opening 77 may also be cut through the body 66 and located at the opposite end of the recess 68 from the opening 76, being uncovered when the spout 67 is swung upwardly as shown in Figs. 11 and 12.

The vent opening 77 of Figs. 10–12 is located in a less advantageous position than is the vent opening 61 of Fig. 9 because if the user tips a bottle in which the cap of Figs. 10–12 is inserted, to a substantial degree, the liquid in the bottle may fill the neck so fully as to reach the height of the vent opening 77 more quickly than the liquid would reach the location of the vent opening 61 if the bottle of Fig. 9 were tipped excessively. This possibility of the liquid reaching a height such that it plugs or pours out of the vent opening in the cap is eliminated by the dual spout embodiment of the invention that is illustrated in Figs. 13 and 14.

A cap 80 embodying the invention as illustrated in Figs. 13 and 14 has a tubular neck 81 similar to the tubular neck 54 of Figs. 8 and 9 and similarly intended to be inserted into the recess at the mouth of a conventional milk bottle. The cap 80 has a folded underside 82 and a similar spaced upper side 83 which are connected to each other by an accordion fold 84 at each of the side edges of the underside and upper side 82 and 83. The underside 82 is cut out at the upper edge of the neck 81 in the same manner as the rim 55 of Fig. 9 meets the neck 54 of Fig. 9. When the cap is in its closed position as is illustrated in Fig. 13 the ends of the upper side 83 and accordion pleats 84 are folded over on top of the top of the upper side 83, thus closing a pair of recessed spouts 85 embodying the invention which are formed by lips 86 at the ends of the underside 82 and lips 87 at the ends of the upper side 83.

When the cap of Fig. 4 is unfolded into the position illustrated in Fig. 14 the accordion folds 84 open slightly, spacing the upper side 83 from the underside 82 and opening the spouts 85. It is thus possible to pour the liquid out of either of the spouts 85 and the other one of the spouts 85 serves as a vent opening.

Having the vent opening furnished by one of the spouts 85 is advantageous since it is sufficiently above the level of liquid being poured when the bottle in which the cap 80 is located is tilted, that there is no possibility of the liquid reaching the vent opening. Air that is vented into the space formed within the cap 80 and into the bottle in which the cap 80 is located is certain to flow freely, smoothing out the flow of liquid out of that one of the spouts 85 through which the liquid is being poured. Furthermore, the possibility of pouring either to the right or left without turning the container may be advantageous under certain circumstances.

In Figs. 15–20 there is illustrated a conventional milk carton which is generally rectangular in shape having a vertical wall 90, side walls 91 and a rear wall 92. At the upper ends of the walls 90, 91 and 92 the front and rear walls 90 and 92 are folded inwardly toward the center and the side walls 91 are tucked into the generally triangular space with the upper edges of the front and rear walls 90 and 92 being overlapped and sealed together by a top fold 93 which may be held in place by a staple 94. The structure so far described is conventional. In a carton of this type one or more pouring openings may be provided out of which milk may be poured but the pouring openings which have been provided in the prior art have been particularly disadvantageous from the standpoint of causing dripping and run-down on the exterior of the carton.

By reason of the inward folding of the upper portions of the sides 91 and the folding over of the upper portions of the front 90 and back 92 of the carton, four upwardly inclined double edges 95 are formed at the corners of the carton. A pouring spout embodying the invention may be built into a carton of this type by cutting away a recess in a folded over section 96 of the front 90 and an under folded section 97 of the side 91. Such a pouring spout is generally indicated at 98 in Figs. 15–20. The pouring spout 98 is defined by angularly meeting lips 99 cut in the section 96 and similar lips 100 cut in the section 97. The pouring spout thus defined is highly similar to the pouring spout 35 of Figs. 1–4 and functions as that pouring spout 35 does to provide for an even pour of liquid as in Fig. 5 and a separating retraction as in Figs. 6 and 7.

Figure 15:
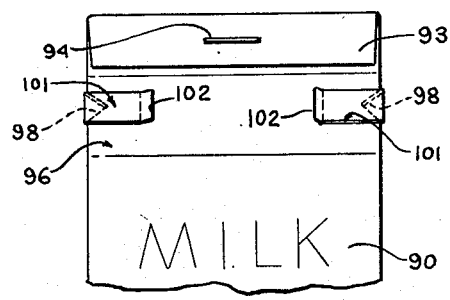
Fig. 15 is a fragmentary view in front elevation of a folded top milk container of the type conventionally fabricated from waxed paper and provided with pouring spouts embodying the invention.
Figure 16:
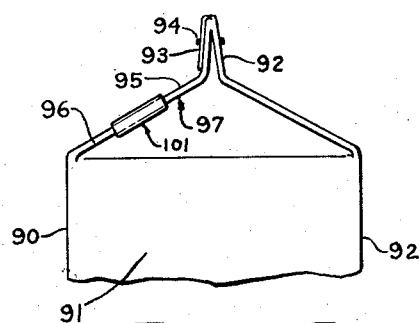
Fig. 16 is a fragmentary view in side elevation of the container shown in Fig. 15.
Figure 17:
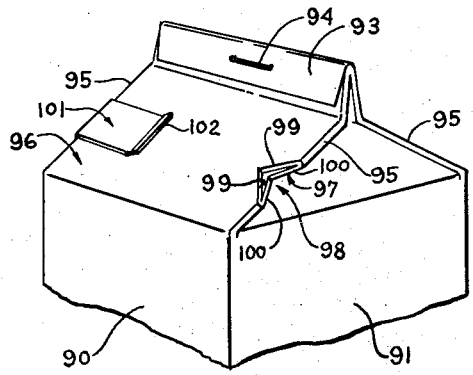
Fig. 17 is a fragmentary, front quarter perspective of the container shown in Figs. 15 and 16 with one of the pouring spouts embodying the invention illustrated in open position.

The section 96 of the front 90 may have two pouring spouts 98, one at each of its corners 95. The spouts 98 may be sealed prior to use as is illustrated in Figs. 15 and 16 by a fold of paper 101 on the exterior of the section 96 and extending around the corner 95 on the undersurface of the section 97. The fold 101 may have a tab 102 by which a user can tear it away. If desired, only one of the folds 101 may be removed as in Fig. 17, or, preferably, both folds 101 are removed as in Fig. 19 so that a flow of liquid generally indicated at 103 may be poured from one of the spouts 98 with the other one of the spouts 98 serving as a vent. As in the case of the cap 80 of Figs. 13 and 14, the location of the vent through a spout 98 at the opposite side of the carton insures free flow of liquid from the other one of the spouts 98.

Figure 18:
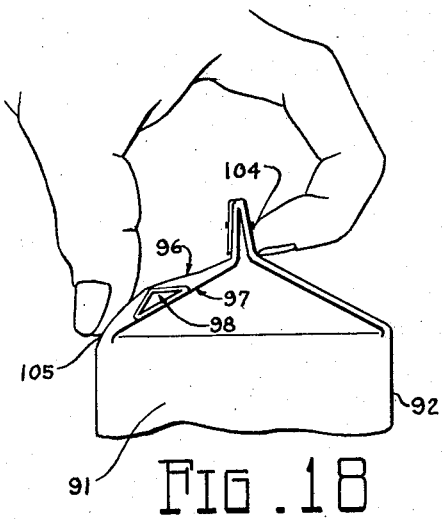
Fig. 18 is a fragmentary side view in elevation illustrating how a pouring spout embodying the invention as built into the container of Figs. 15–17 can be opened more widely by the thumb and forefinger of a user.
Figure 19:
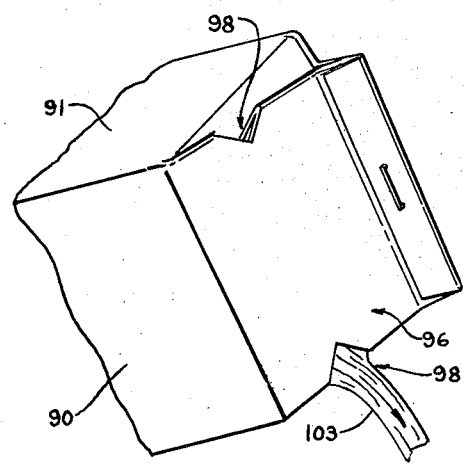
Fig. 19 is a fragmentary view in perspective illustrating the pouring of a liquid out of a spout as built into the container of Figs. 15–18.
Figure 20:
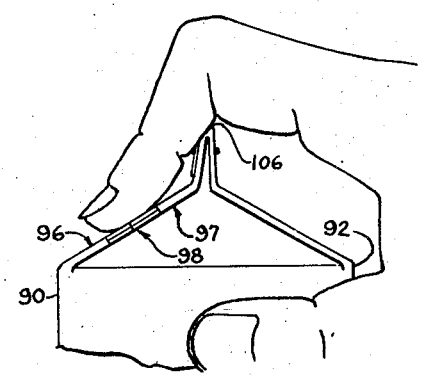
Fig. 20 is a fragmentary view in side elevation similar to Fig. 16 but showing how a pouring spout embodying the invention may be squeezed closed by the thumb and forefinger of a user.

The spout 98 embodying the invention in a carton as illustrated in Figs. 15–20 may be further opened for increasing the flow of milk or other liquid through the spout 98 by placing the forefinger behind the upper overlapped ends of the front 90 and back 92 of the carton as indicated at 104 in Fig. 13 and placing the thumb against the section 97 where it meets the front 90 as indicated at 105 in Fig. 18. By squeezing the thumb and forefinger together the section 96 of the front 90 is caused to bulge upwardly, opening the spout 98. When the pouring is completed and retraction has taken place as indicated in Figs. 5–7, the spout 98 may be tightly closed by reversing the position of the hand and squeezing downwardly with the forefinger on the section 96 twisting the overlapped portions of the front 90 and back 92 as at 106 to press the lips 99 and 100 together to close the spout 98. This is particularly advantageous when an unused quantity of liquid, for example milk, is to be stored in a refrigerator since it prevents the ingress of disagreeable odors into the container.

Figs 21–24 illustrate how another conventional type of carton for containing milk and other liquids can be provided with a pouring spout embodying the invention. In this instance a container 110 has a flat top 111 the surface of which is perpendicular to the surfaces of its front 112 and sides 113. Cartons of this type conventionally are provided with a tabbed, recessed cap 114 located in the top 111 and closing an opening 115 (Fig. 23) through the top 111. This opening 115 and its tab 114 may be retained in a carton of this type when modified to include a pouring spout embodying the invention and if retained will function as a vent.

In a carton of this type as modified according to the invention, a rectangular recess 116 is formed in the top near its edge which meets the front 112 and a similar recess 117 of lesser depth may be formed in the front 112, meeting the recess 117. When the carton is sealed, the recesses 116 and 117 are closed by a removable strip 118 which may be provided with a thumb tab 119 for grasping by the user. Near the front corner of the top 111 an opening 120 opens beneath a spout 121 which consists of a top 122 and bottom 123 that are connected along their sides by accordion folds 124. The top 122 is sealed to the carton top 111 at the edge of the opening 120 and the bottom 123 of the spout 121 is sealed to the front wall 112 of the carton just below the front upper corner. The top 122 and bottom 123 of the spout 121 terminate to form a recessive spout opening 125 defined by lips 126 and 127 respectively.

As is the case with other embodiments of the invention, the spout opening 125 operates effectively to split the film of liquid flowing therethrough upon cessation of flow according to the diagrammatic representation of Figs. 5–7, inclusive.

While a number of the modifications of the invention described herein have been illustrated as applied to one form or another of container suitable for the dispensing of milk, these caps and spouts function equally well for dispensing thicker liquids such as cream, which also is packaged in similar containers, and even more viscous liquids such as syrups, molasses, etc. The modifications illustrated herein have been shown in various forms and types in order to point out clearly the fact that the particular detailed design of the structure forming a pouring spout according to the invention is not critical. The essential elements of such a pouring spout consist only of the spaced top and bottom and the recessive lips defining the opening. The particular shape of the lips, i. e., whether the recess is a cresent, an arc, a V-shaped notch or otherwise, is not critical, it being necessary only that the center portion shall be recessed relative to the edges and that the upper and lower surface forming the lips shall be spaced from each other by a relatively small distance to provide a film of flowing liquid rather than a stream of cross section more or less equal to its width. For any particular liquid to be poured variations in the relative vertical spacing and width of the lips, their particular shape and angle of meeting may be made within the spirit and scope of the subjoined claims.

It should also be observed that pouring spouts embodying the invention inherently possess a further advantage which is made effective by the cooperation of a pouring spout embodying the invention with a suitably located venting opening like those described in the several embodiments shown in the drawings. By reason of the pouring spout of the invention defining an orifice of definite size, the rate of maximum flow of a poured liquid through the spout is controlled with a vent so located as to admit air into the container at a level above the surface of the liquid and thus to prevent gurgling. A pouring spout of the invention also prevents gushing of the liquid and consequent spilling, particularly when the liquid is being poured by a child. This advantage of the invention has particular merit in those instances where the pouring spouts are incorporated in or serve as closures for milk containers of one type or another. A liquid container equipped with a pouring spout embodying the invention suitably vented as shown, thus not only is kept in sanitary condition by the prevention of dripping down its exterior but when the liquid is poured gushing and gurgling are eliminated to prevent the splashing of the liquid from or spilling the liquid around a glass or other vessel into which it is being poured.

I claim:

1. A dripless enclosed pouring spout for liquids including substantially flat upper and lower surfaces and side surfaces terminating in spaced apart substantially flat upper and lower lips which are connected at their lateral edges and forming a liquid pouring opening that is appreciably wider than it is high, at least one of said substantially flat upper and lower lips being centrally provided with a V-slot recess wherein the included angle of the V-slot recess does not exceed substantially a right angle, the liquid, upon cessation of pouring, withdrawing into the pouring opening and the surface thereof splitting along a plane generally bisecting the angle of the V-slot recess whereby the liquid is retracted into the spout without dripping.

2. A dripless enclosed pouring spout for liquids including substantially flat upper and lower surfaces and side surfaces terminating in spaced apart substantially flat upper and lower lips which are connected at their lateral edges and forming a liquid pouring opening that is appreciably wider than it is high, each of said substantially flat upper and lower lips being centrally provided with a V-slot recess wherein the included angle of the V-slot recess does not exceed substantially a right angle, the liquid, upon cessation of pouring, withdrawing into the pouring opening and the surface thereof splitting along a plane generally bisecting the angles of the V-slot recesses whereby the liquid is retracted into the spout without dripping.

3. A dripless enclosed pouring spout for pouring liquid from a container including spaced apart substantially flat upper and lower surfaces and side surfaces forming a liquid passage disposed substantially laterally with respect to the container and communicating with the interior of the container and outwardly terminating in spaced apart substantially flat upper and lower lips which are connected at their lateral edges and which form a liquid pouring opening which is appreciably wider than it is high, at least one of said substantially flat upper and lower lips being centrally provided with a V-slot recess wherein the included angle of the V-slot recess does not exceed substantially a right angle, the liquid, upon cessation of pouring, withdrawing into the pouring opening and the surface thereof splitting along a plane generally bisecting the angle of the V-slot recess whereby the liquid is retracted into the spout without dripping.

4. A dripless enclosed pouring spout for liquids including substantially flat upper and lower surfaces terminating in relatively closely spaced apart substantially flat upper and lower lips which form a liquid pouring opening which is appreciably wider than it is high, at least one of said substantially flat upper and lower lips being centrally provided with a recess, the liquid upon cessation of pouring, stretching a film of liquid molecules across said pouring opening between said upper and lower lips which is vertically split within the recess whereby the liquid is retracted into the spout without dripping.

5. A dripless enclosed pouring spout for pouring liquid from a container and including substantially flat upper and lower surfaces and side surfaces forming a liquid passage communicating with the interior of the container and outwardly terminating in closely spaced apart substantially flat upper and lower lips which are connected at their lateral edges and which form a liquid pouring opening which is appreciably wider than it is high, at least one of said substantially flat upper and lower lips being centrally provided with a recess, the liquid, upon cessation of pouring, stretching a film of liquid molecules across said pouring opening between said upper and lower lips by cohesion of the liquid molecules and adhesion thereof to said lips, and the liquid, upon returning to the container, stressing the film of liquid molecules to withdraw the film into the pouring opening, and to split substantially vertically the film within the recess for retracting the liquid into the spout without dripping.

References Cited in the file of this patent

UNITED STATES PATENTS

| 332,239 | Denton | Dec. 15, 1885 |
| 1,357,629 | Faistl et al. | Nov. 2, 1920 |
| 1,436,645 | Brown | Nov. 28, 1922 |
| 2,026,839 | Krause | Jan. 7, 1936 |
| 2,099,412 | Seidler | Nov. 16, 1937 |
| 2,293,182 | Vogt | Aug. 18, 1942 |
| 2,312,044 | Moore | Feb. 23, 1943 |
| 2,323,505 | Wilcox | July 6, 1943 |
| 2,337,730 | Berch | Dec. 28, 1943 |